July 27, 1965  R. B. WENGER  3,196,697
APPARATUS FOR TRANSMITTING AND MODIFYING MOTION
Filed March 26, 1963  3 Sheets-Sheet 3
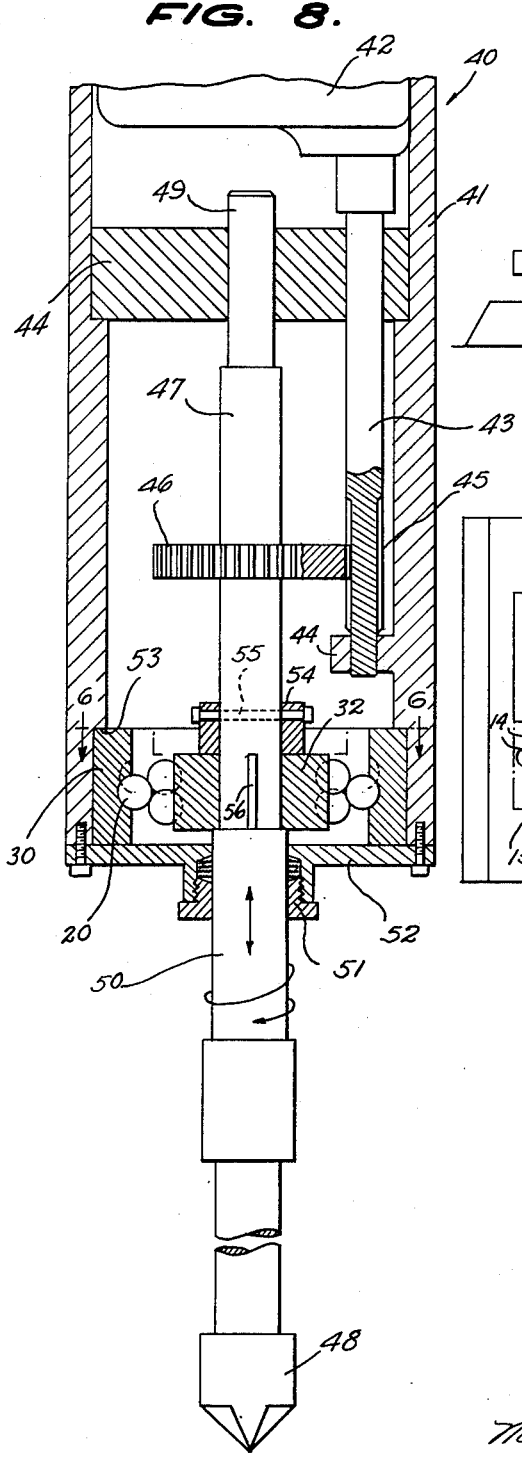
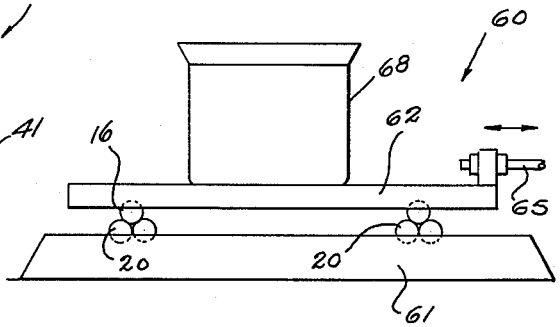
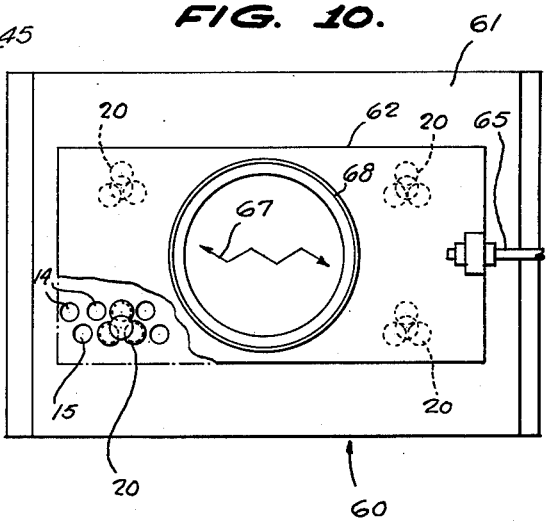
INVENTOR.
RICHARD B. WENGER,
BY
McMorrow, Berman + Davidson
ATTORNEYS.

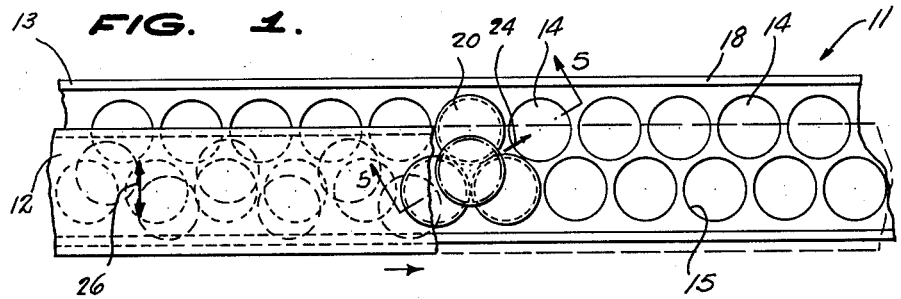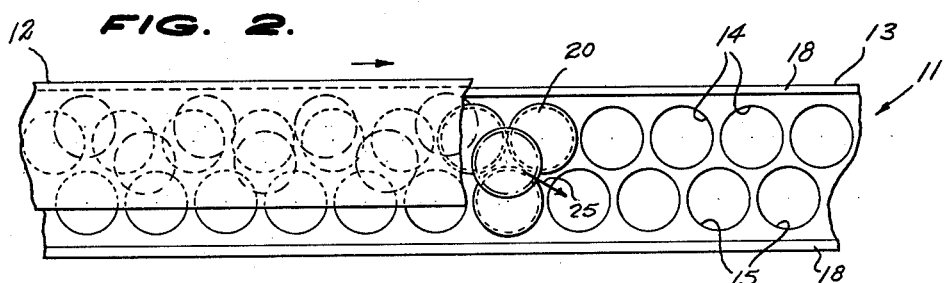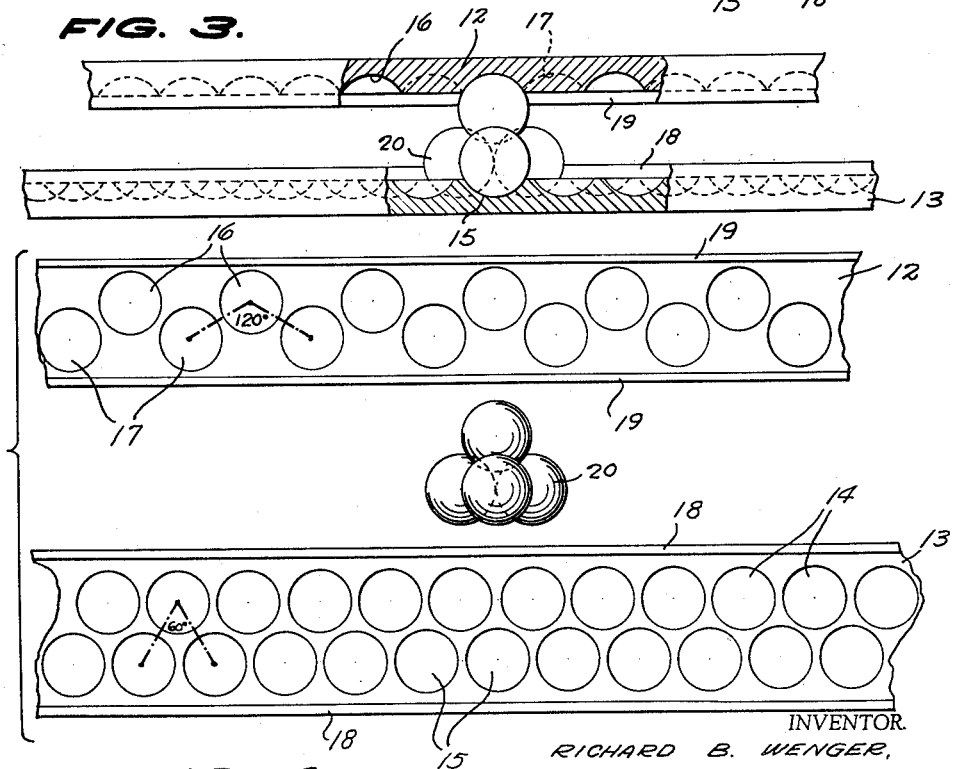

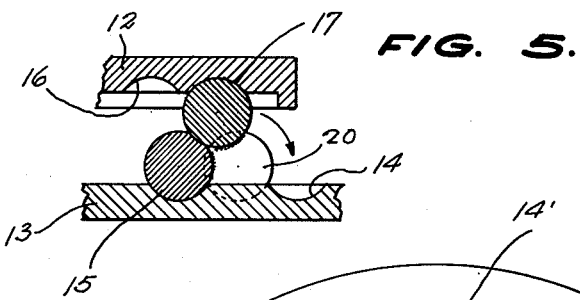
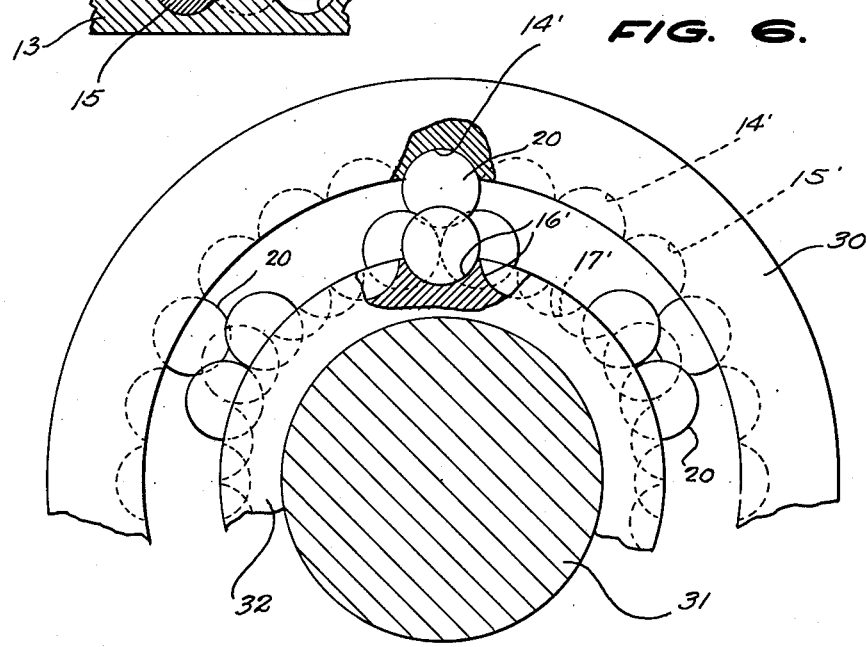
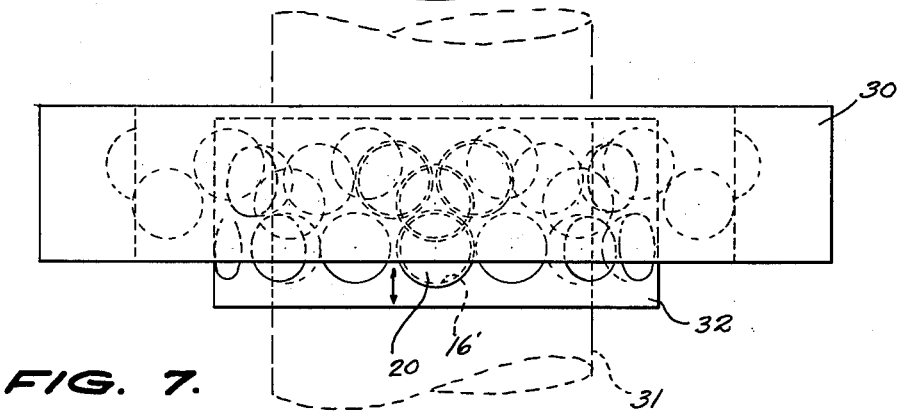

United States Patent Office 3,196,697
Patented July 27, 1965

3,196,697
APPARATUS FOR TRANSMITTING AND
MODIFYING MOTION
Richard B. Wenger, 260 Main St., Saugerties, N.Y.
Filed Mar. 26, 1963, Ser. No. 268,129
8 Claims. (Cl. 74—22)

This invention relates to power transmission systems, and more particularly to systems for converting motion of one type into motion of a different type, for example, for converting rectilinear or rotary motion into reciprocating motion.

The main object of the invention is to provide a novel and improved power transmission system for conversion of motion of an essentially unidirectional type into motion of a reciprocating type, the invention involving relatively simple components, being efficient in operation, and providing smooth and reciprocating action.

A further object of the invention is to provide an improved power transmission mechanism to develop reciprocating motion, said mechanism involving relatively inexpensive components, operating with a minimum amount of wear and noise, and distributing the reversing portions of its cycle of motion in a manner to minimize the forces of acceleration developed by the changes in direction of its parts.

A still further object of the invention is to provide an improved mechanism for developing reciprocating motion, said mechanism employing gearingly related members which also act as anti-friction members and which cooperate to translate essentially rectilinear movement into reciprocating movement of an essentially sinusoidal type, the translation of motion being accomplished with high efficiency, with relatively low heat loss, and without imposing excessive mechanical stresses on the cooperating parts.

A still further object of the invention is to provide an improved power transmission device for converting rectilinear or rotary motion into reciprocating motion, the active elements of the mechanism combining the functions of bearings and gears and operating to translate the applied motion into reciprocating motion in an efficient, relatively quiet and completely controlled manner, whereby the mechanism is particularly useful for a wide variety of practical applications, such as in rock drills, article vibrating devices, or in any other apparatus requiring the reciprocation of an element with relatively small amplitude, such as in weaving, or the like.

Further objects and advantages of the invention will become apparent from the following description and claims, and from the accompanying drawings, wherein:

FIGURE 1 is a fragmentary top plan view of one form of power transmission device according to the present invention wherein a first main element is reciprocated laterally relative to a second main element responsive to a longitudinal driving force applied to said first element, the first main element being shown at one limit of lateral excursion thereof.

FIGURE 2 is a fragmentary top plan view of the structure of FIGURE 1 with the first main element being shown at the opposite limit of its lateral excursion.

FIGURE 3 is a fragmentary elevational view of the structure of FIGURES 1 and 2, shown partly in vertical cross section.

FIGURE 4 is a fragmentary plan view of the parts of the mechanism of FIGURES 1 to 3, the parts being shown in separated positions.

FIGURE 5 is a fragmentary vertical cross sectional view taken substantially on the line 5—5 of FIGURE 1.

FIGURE 6 is a fragmentary horizontal cross sectional view taken through a mechanism for converting rotary drive into axial reciprocating motion, in accordance with the present invention.

FIGURE 7 is an elevational view of the motion converting mechanism of FIGURE 6.

FIGURE 8 is a fragmentary vertical cross sectional view taken through a rock drill employing a motion converting mechanism according to the present invention, namely a mechanism for translating rotary drive into axial reciprocation, similar to that disclosed in FIGURES 6 and 7.

FIGURE 9 is a side elevational view of an object vibrating machine employing a motion converting mechanism according to the present invention, namely, a machine for shaking or vibrating a container wherein longitudinal movement of the object supporting platform element is converted into transverse reciprocating movement thereof.

FIGURE 10 is a top plan view, partly broken away, of the apparatus of FIGURE 9.

Referring to the drawings, and more particularly to FIGURES 1 to 5, inclusive, 11 generally designates a typical apparatus constructed in accordance with and employing the principles of the present invention. The apparatus 11 is intended to convert or transform longitudinal driving force applied to a bar member 12 into lateral reciprocatory movement thereof relative to a stationary bottom bar 13. Thus, the bottom bar 13 may be secured on any suitable support, for example, a horizontal surface, and the top member 12 may be mounted so that it can move in a plane parallel to the plane of the bottom member 13 and is conected to a suitable means for applying longitudinally directed force thereto, for example, for driving the member 12 in a longitudinal direction, the member 12 being free to reciprocate laterally while being so driven.

The stationary bottom bar member 13 has a top surface provided with two rows of upwardly facing spherically-shaped cavities 14 and 15, said cavities being of identical size and shape but being staggered relative to each other, as is clearly shown in FIGURE 4, the longitudinal spacing between the cavities being uniform. The bottom surface of the upper bar member 12 is formed with similar downwardly facing cavities of the same spherical shape and size and being arranged in two staggered rows 16 and 17, the cavities 16 being uniformly spaced and the cavities 17 being uniformly spaced at the same spacing as the cavities 16 but being staggered relative thereto, as is clearly shown in FIGURE 4. As will be further apparent from FIGURE 4, the center lines connecting the cavities 16 and 17 are more closely spaced than the center lines connecting the cavities 14 and 15, for a purpose which will presently appear.

The bottom bar member or raceway 13 is provided at its side edges with upstanding marginal flanges 18, 18, serving as retaining flanges, and the top bar member or raceway 12 is similarly provided with depending marginal flanges 19, 19 at its side edges, likewise serving as retaining flanges.

From FIGURES 1, 2 and 4, it will be seen that the recesses 14 and 15 in the raceway member 13 are located so that their centers define equilateral triangles, namely, so that two successive recesses of one row and the intermediately adjacent recess of the other row always defines an equilateral triangle. In other words, the center lines between the central points of the recesses, when connected from one row to the next successively will make angles of 60° with each other, as shown in FIGURE 4. However, the recesses 16 and 17 of the race member 12 are so located that the lines connecting the centers of successive recesses 16 and 17 will make angles of 120° with each other, as is shown in FIGURE 4.

Disposed between the race bars 12 and 13 are one or more gearing elements 20 in the form of a rigid body of generally tetrahedron shape whose corner portions are spherically rounded to pivotally engage in the respective spherically rounded recesses 14, 15, 16 and 17. Thus, the gearing elements 20 may consist of four substantially identical bearing balls having the same radius as the recesses 14, 15, 16 and 17 and being rigidly secured together in peripherally engaging relationship, as shown in FIGURE 4, to define a regular tetrahedron whose respective corners comprise spheres. The equilateral triangle defined by the base portion of the tetrahedral body 20 is identical with the equilateral triangle defined by three successive recesses 15, 14, 15 or 14, 15, 14 of the race bar member 13. Obviously, the tetrahedral body 20 may tumble around axes defined by any two of its base spherical corner components, whereupon in the new position of the gearing element its base again defines an equilateral triangle.

As shown in FIGURE 1, with the gearing element 20 disposed between the race members in the position shown, a longitudinal force applied to the upper race bar 12 directed toward the right, as viewed in FIGURE 1, will cause the gearing element 20 to tumble or rotate in the direction indicated by the arrow 24, namely, upwardly and to the right, as viewed in FIGURE 1, giving the upper race bar 12 a component of lateral motion tending to move it transversely, as diagrammatically indicated by the arrow 26 in FIGURE 1. Thus, the race bar 12 will shift from the position of FIGURE 1 to the position of FIGURE 2. Continued application of rightward force to the upper race bar 12 will cause the gearing element 20 to again tumble, this time in the direction indicated by the arrow 25 in FIGURE 2, namely, in a direction to cause the race bar 12 to be moved transversely back toward the position thereof shown in FIGURE 1. Continued rightward movement of the upper race member 12 relative to the lower race member 13 will cause the upper race member to reciprocate transversely and will give it a substantially sinusoidal path of movement relative to the lower race bar 13, whereby, it will move substantially parallel to the lower race bar but will simultaneously reciprocate laterally or transversely relative thereto.

As will be readily apparent, the tetrahedral body 20 will tumble or roll continuously, pivoting in the upper and lower pairs of recesses 14, 15 and 16, 17, operating like a gear or cog between the race members 12 and 13.

Any desired number of gearing elements 20 may be employed between the raceway members 12 and 13, in accordance with the specific requirement of the apparatus in which the power transmission device is employed.

Referring now to FIGURES 6 and 7, there is illustrated an application of the principle of the present invention to the conversion of torque or rotational force into axial reciprocating force. Thus 30 designates a stationary outer raceway which is of annular shape and which is formed on its inside surface with two staggered rows of inwardly facing spherical cavities 14' and 15', and 31 designates a shaft which is driven rotationally by any suitable power source, while being free to reciprocate in an axial direction. Rigidly secured on shaft 31 inside the raceway 30 is an inner raceway collar 32 which is formed with two staggered rows of outwardly facing spherical cavities 16' and 17'.

The cavities 14' and 15' are arranged relative to each other substantially in the manner of the cavities 14 and 15 of the raceway member 13 of FIGURE 4, and the cavities 16' and 17' are arranged relative to each other in a manner generally similar to that in which the cavities 16 and 17 of the raceway 12 of FIGURE 4 are arranged.

Disposed between the raceway members 30 and 32 are a plurality of tetrahedral gearing elements 20, as above described, whose spherical corner portions pivotally engage in the recesses 14', 15' and 16', 17', so as to reciprocate the collar element 32 in an axial direction responsive to rotation of the shaft 31 with respect to the outer raceway member 30. Thus, when the shaft 31 rotates with the outer raceway member 30 held stationary, the cog or gearing element 20 will tumble in the manner previously described to reciprocate the shaft 31 axially while it is rotating, because of the reaction developed by the stationary outer raceway member 30.

The gearing elements 20 serve also as bearings for the shaft member 31, providing smooth and efficient transmission of power to the shaft accompanied by the resolution of the torque applied thereto into rotational and reciprocatory components.

It will be understood that the shaft 31 will be suitably loaded, and that said shaft will be driven under its load, being rotated and being simultaneously reciprocated in the direction of its axis by the tumbling action of the gearing elements 20, as above described, while the outer raceway member 30 is held stationary.

In the case of the embodiment of the invention illustrated in FIGURES 1 to 5, the bar members 12 and 13 are urged towards each other, for example, by a load on the upper bar member 12, and the upper bar member 12 is driven while under its load so as to be reciprocated laterally while it is being driven longitudinally, by the tumbling action of the gearing elements 20, as above described.

FIGURE 8 illustrates a practical application of the device of the present invention, embodied in a rock drill, designated generally at 40. The drill 40 comprises a main housing 41 which is vertically elongated and which is provided in its upper portion with an electric motor 42 having a depending vertical output shaft 43 which is journaled at its bottom end in a bearing lug 44 integrally formed in the wall of the housing 41 and projecting inwardly, so that the shaft 43 is rotatably supported adjacent to and parallel to the inner wall of said housing 41. The upper portion of the shaft 43 extends rotatably through and is rotatably supported by a horizontal partition wall 44 secured in the main housing 41.

The lower portion of the shaft 43 is integrally formed with gear teeth 45 which mesh with a substantially larger gear 46 mounted on the spindle shaft 47 of the rock drill bit 48, the top end portion of the spindle shaft 47 being reduced, as shown at 49, and being rotatably engaged centrally in the partition wall 44. The reduced portion 49 of spindle shaft 47 is also slidable axially relative to the partition wall 44, so that it can both rotate and reciprocate vertically.

The spindle shaft of the rock drill is provided with a cylindrical intermediate portion 50 which extends rotatably and slidably through a gland assembly 51 provided centrally on the circular bottom wall 52 of main housing 41, the shaft portion 50 being rotatable and slidable in the gland assembly 51. The lower portion of the cylindrical wall of housing 41 is annularly recessed, as shown at 53, and secured in said annularly recessed lower portion is the outer race member 30 of an assembly similar to that illustrated in FIGURES 6 and 7, said outer race member having inwardly facing spherical recesses, as previously described, in which are pivotally engaged the spherically shaped corner portions of a plurality of tetrahedral gearing elements 20. Secured on the spindle shaft 47 within and concentrically with the outer race member 30 is an inner race collar member 32 having outwardly facing spherical recesses arranged in two rows staggered with respect to each other, and pivotally receiving the spherically rounded corner portions of the tetrahedral gearing elements 20. The inner race member 32 is held against the annular shoulder defined by the top of shaft portion 50 by a retaining collar 54 rigidly secured on the spindle shaft 47 by a transversely extending headed fastening pin member 55, so that the inner race member 32 is rigidly secured on the spindle shaft 47. As shown in FIGURE 8, a locking key 56 may be provided for engaging in opposing grooves in the spindle shaft 47 and the inside bore of race member 32 to prevent relative rotation of the race member with respect to the spindle shaft 47.

In operation, the motor 42 drives the spindle shaft 47 through the gear members 45 and 46, causing the inner race member 32 to be rotated. The tumbling action of the cog or gear elements 20, as above described, causes the shaft 47 to reciprocate axially while it is being rotated, thus providing the drill bit 48 with the same type of movement, namely, vertical reciprocation simultaneous with rotation.

Suitable lubricant may be provided between the inner race member 32 and the outer race member 30, since a lubricant well is defined between said race members. Lubrication of the bearing members 20 facilitates their free tumbling action and the pivoting action of their spherical corner elements in the recesses of the raceway members 30 and 32, facilitating the smooth and efficient transmission of power through the mechanism.

FIGURES 9 and 10 illustrate another practical application of a motion converting device according to the present invention, embodied in a material vibrating apparatus, designated generally at 60. The apparatus 60 comprises a stationary base 61 over which extends a movable platform 62, the platform being supported by a plurality of cooperating tetrahedral gearing elements 20 supportingly arranged between the platform 62 and the base 61. Thus, the platform 62 may be substantially rectangular, as illustrated, and the tetrahedral gearing elements 20 may be provided between the respective corner portions of the platform and the base member 61. Each portion of the base member beneath a corner area of the platform is formed with two rows of staggered spherical recesses 14 and 15, similar to those provided in the lower raceway member 13 of FIGURES 1 to 4, and the underside of the platform member 62 is formed with downwardly facing pairs of staggered rows of recesses, similar to the staggered rows of recesses 16 and 17 of FIGURES 1 to 4, located over the rows of recesses 14 and 15 and being arranged parallel thereto. The staggered rows of recesses may be arranged longitudinally, as illustrated in FIGURE 10, namely, in the direction of the length of the rectangular platform 62.

Disposed beneath each corner portion of the platform 62 is a tetrahedral gearing element 20 pivotally engaging in the recesses 14, 15 of the base member 61 and the downwardly facing spherical recesses of the platform member 62 and being cooperable therewith to reciprocate the platform member 62 transversely while it is being moved longitudinally. A drive rod 65 is connected to the intermediate portion of one end of the platform member 62, the drive rod 65 being connected to a suitable source of driving power which applies a reciprocating longitudinal force to the drive rod, tending to move the drive rod 65 back and forth along its longitudinal axis. The drive rod 65 is sufficiently flexible so that it can deviate laterally in accordance with the transverse or lateral movement of the platform 62. Said lateral movement is produced by the resolution of the applied force into respective reactions tending to move the platform 62 laterally while it is being driven longitudinally, because of the above described tumbling action of the gearing elements 20, to provide a path of movement represented generally by the sinusoidally shaped line 67 in FIGURE 10.

Supported on the platform 62 is a container 68 in which is disposed the material to be agitated or shaken. The load acting on the platform 62 is such as to maintain the gearing elements 20 continuously in pivotal engagement with the recesses of the base member 61 and the paltform member 62 and to insure continuous coupling action between these members while the platform member 62 is being longitudinally reciprocated by the drive rod 65.

While certain specific embodiments of an improved device for converting motion has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a device for converting motion, a first race member having a surface provided with a pair of parallel staggered rows of recesses, a second race member having a surface facing said first-named surface and provided with a pair of parallel staggered rows of recesses extending parallel to said first-named rows, and a substantially tetrahedral rigid body interposed between said race members and having corner portions gearingly engaging in said recesses, said body being rotatably responsive to a force applied to one of said race members with the other race member held stationary, and developing a reaction moving said one race member laterally with respect to the direction of said force.

2. In a device for converting motion, a first race member having a surface provided with a pair of parallel staggered rows of spherically curved recesses, a second race member having a surface facing said first-named surface and provided with a pair of parallel staggered rows of spherically curved recesses extending parallel to said first-named rows, and a substantially tetrahedral rigid body interposed between said race members and having spherically curved corner portions gearingly engaging in said recesses, said body being rotatably responsive to a force applied to one of said race members with the other race member held stationary, and developing a reaction moving said one race member laterally with respect to the direction of said force.

3. In a device for converting motion, a first race member having a surface provided with a pair of parallel staggered rows of recesses, said recesses being spaced so that two successive recesses of one row and the intermediately adjacent recess of the other row define an equilateral triangle, a second race member having a surface facing said first-named surface and provided with a pair of parallel staggered rows of recesses extending parallel to said first-named rows, and a substantially tetrahedral rigid body interposed between said race members and having corner portions gearingly engaging in said recesses, said body being rotatably responsive to a force applied to one of said race members with the other race member held stationary, and developing a reaction moving said one race member laterally with respect to the direction of said force.

4. In a device for converting motion, a first race member having a surface provided with a pair of parallel staggered rows of spherically curved recesses, said recesses being spaced so that two successive recesses of one row and the intermediately adjacent recess of the other row define an equilateral triangle, a second race member having a surface facing said first-named surface and provided with a pair of parallel staggered rows of spherically curved recesses extending parallel to said first-named rows, and a substantially tetrahedral rigid body interposed between said race members and having spherically curved corner ball portions gearingly engaging in said recesses, said body being rotatably responsive to a force applied to one of said race members with the other race member held stationary, and developing a reaction moving said one race member laterally with respect to the direction of said force.

5. In a device for transforming motion, a first support member, means on said first support member defining three concave seats spaced to define an equilateral triangle, respective bearing balls disposed in said seats, a second support member opposing and being substantially parallel to said first support member, means defining a concave seat in said second support member facing said first-named seats, a bearing ball in said last-named seat rigidly secured at its periphery to the peripheries of the three first-named bearing balls, and means to apply a force to one of said support members acting in a direction substantially parallel to said support members, whereby to develop a reaction directed laterally relative to the direction of said force.

6. In a device for transforming motion, a first support member, means on said first support member defining three concave seats spaced to define an equilateral triangle, respective bearing balls disposed in said seats and rigidly peripherally secured to each other, a second support member opposing and being substantially parallel to said first support member, means defining a concave seat on said second support member facing said first-named seats, a bearing ball in said last-named seat rigidly secured at its periphery to the peripheries of the three first-named bearing balls, said bearing balls being all of the same diameter, and means to apply a force to one of said support members acting in a direction substantially parallel to said support members, whereby to develop a reaction directed laterally relative to the direction of said force.

7. In a motion transforming device, a first body, a second body disposed adjacent and substantially parallel to said first body, means to apply a rectilinearly directed force to said first body, means to restrain movement of the second body, a first group of bearing balls pivotally seated in the inside surface of one of said bodies, said group including at least three balls rigidly secured together in a triangular configuration, and at least one bearing ball pivotally seated in the other body and rigidly secured at its periphery to the peripheries of said three first-named bearing balls, whereby to develop a reaction tending to deviate the driven body in a lateral direction relative to the direction of application of said force.

8. The structure of claim 1, and wherein said race members are substantially annular and are concentrically arranged.

References Cited by the Examiner

UNITED STATES PATENTS

| D. 29,532 | 10/98 | Woglom | D74—12 |
| 2,226,137 | 12/40 | Pool | 74—22 XR |
| 2,547,594 | 4/51 | Ohlsson | 74—50 |

FOREIGN PATENTS

| 502,872 | 3/39 | Great Britain. |

BROUGHTON G. DURHAM, *Primary Examiner.*